United States Patent [19]

Coleman et al.

[11] 4,063,622

[45] Dec. 20, 1977

[54] FLUID PRESSURE OPERABLE BRAKE ACTUATORS WITH FLUID OPERABLE BRAKE SOCK AND RELEASE

[75] Inventors: John Dale Coleman; Philip Norman Paginton, both of London, England

[73] Assignee: Westinghouse Brake & Signal Co. Ltd., London, England

[21] Appl. No.: 664,862

[22] Filed: Mar. 8, 1976

[51] Int. Cl.² ............................................. B60T 17/16
[52] U.S. Cl. .................................. 188/153 R; 92/32; 188/265
[58] Field of Search .................. 188/170, 153 R, 72.3, 188/265, 216; 303/71, 89, 89 XR; 192/91 R, 91 A; 92/32, 33, 63, 130 A, 17, 24, 27–28

[56] References Cited

U.S. PATENT DOCUMENTS

| 2,632,426 | 3/1953 | Geesink | 92/33 X |
| 3,586,138 | 6/1971 | Engle | 188/265 |
| 3,770,084 | 11/1973 | Hill | 188/265 |

Primary Examiner—Trygve M. Blix
Assistant Examiner—Douglas C. Butler
Attorney, Agent, or Firm—Larson, Taylor and Hinds

[57] ABSTRACT

An air operated brake actuator has an air pressure operated brake force applying member, the application to and removal of pressure from which member determines the brake force, another such member which must be separately pressurised to follow the first member to lock in a brake force, and yet another member which requires to be additionally pressurized to effect unlocking of the brake force.

4 Claims, 1 Drawing Figure

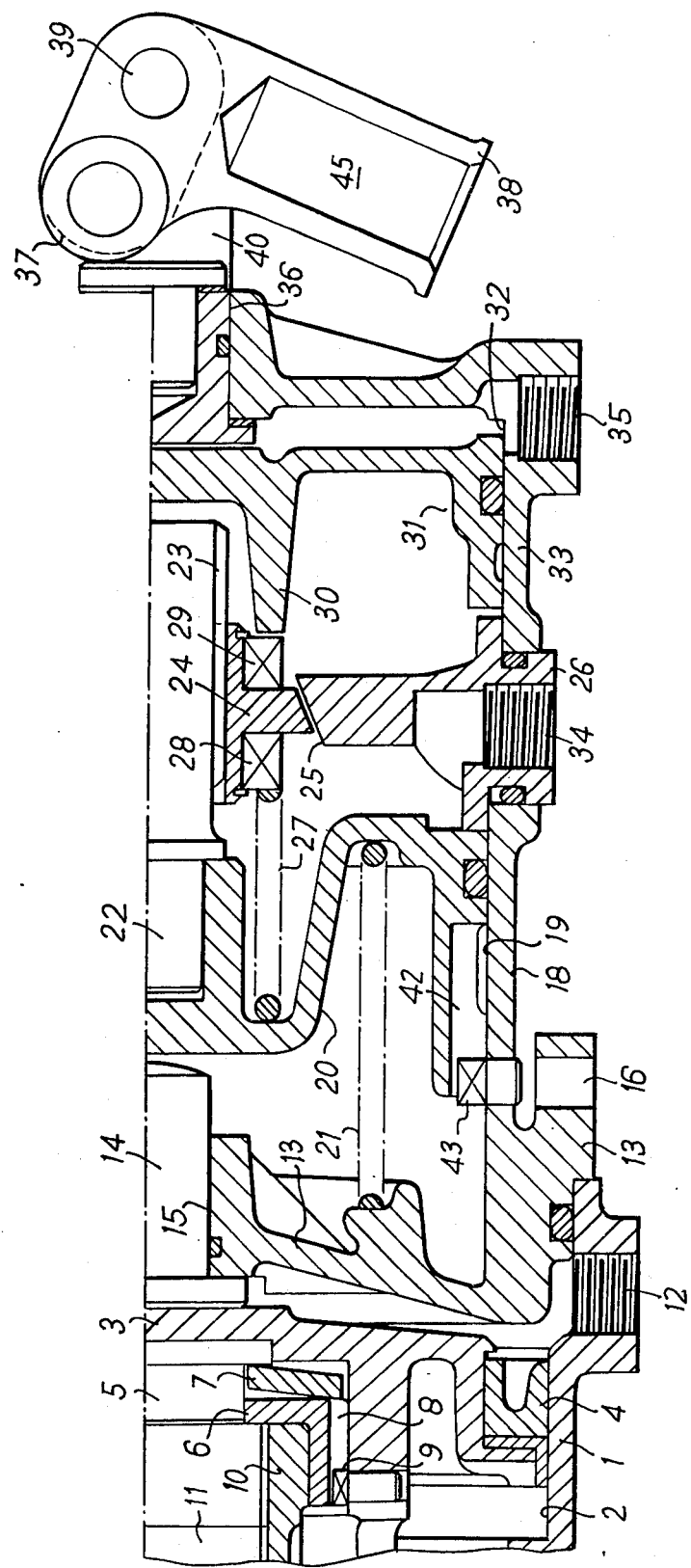

FLUID PRESSURE OPERABLE BRAKE ACTUATORS WITH FLUID OPERABLE BRAKE SOCK AND RELEASE

This invention relates to fluid pressure operable brake actuators and relates particularly to brake actuators which are provided with a facility for locking-in a braking force and to such actuators especially but not exclusively for railway braking applications.

According to the present invention there is provided a fluid pressure operable brake actuator including a housing having a brake force output member movable therein and actuable by a first fluid pressure responsive member, the actuator also including a further fluid pressure responsive member in a chamber sealed from the first member and being separately pressurable to follow and engage means connected in effect to said first pressure responsive member and having locking means coupled to and operable in conjunction with the further member to lock-in a brake applicaton only when the further member is actuated and a third member operation of which is required to actuate the locking means to unlock a locked-in brake application.

The further member may be of an area which is comparable to the area of the first pressure responsive member so that when actuated, the further member may appreciably supplement the braking force contributed by the first pressure responsive member.

The locking means may comprise two mutually helically threaded members one of which is clutched against unlocking movement of the further member.

In order that the invention may be more clearly understood and readily carried into effect, the same will be further described by way of example with reference to the accompanying wherein The single FIGURE illustrates in part-sectioned diagrammatical form, the relevant part of a brake actuator employing the invention.

Referring to the drawing, this shows only a lower half of an actuator employing the invention, and the portion of the actuator to the left which includes a slack adjuster before being connected to the brake rigging is omitted for convenience since this may be of any suitable known form. The actuator comprises for its service portion, a body 1, having a cylinder 2, within which there is a movable pressure responsive member in the form of a piston 3, having a piston seal 4. The piston 3 bears against a pad 5 between which and a sliding collar 6 there is a suitably rated Belleville washer 7. The sleeve 6 is keyed by means of a groove 8 and a pin 9 to the body of the piston to resist rotation thereof whilst permitting relative sliding motion and in turn the sleeve 6 has a flange by means of which it bears upon the right hand end of a tube 10 which is the outer tube of a slack adjuster having an inner rod 11. The rod 11 is threaded in the tube 10, and in known manner for the purposes of adjusting slack, the tube 10 is rotatable relative to the rod 11 to expand or contract the actuator in relation to the rigging. The housing 1 is provided with a fluid pressue input port pressure and a back plate 13 sealingly mounted within the housing. The back plate 13 is provided with an aperture 15 within which the stem 14 of a piston rod is sealingly slideable to provide communication with piston 3 from the rear of the plate 13. The apparatus described thus far is a fluid operable actuator which enables service applications to be made quite independently of any locking means merely by application of a suitable value of pneumatic pressure to the input port 12. For this purpose, the back plate 13 is fixed by means of bolts through holes such as 16 to the bogie of a rail vehicle upon which the actuator is mounted.

Back plate 13 is provided with a further cylinder 18 having an internal cylindrical bore 19 within which there is sealingly slideable to further pressure responsive member in the form of a piston 20. A spring 21 is provided between the piston 20 and the back plate 13 such as to urge the piston 20 to the right. The piston 20 is provided with a piston rod 22 which is provided with a threaded portion 23 upon which there is carried a threaded nut 24 which in conjunction with a surface 25 in a further housing portion 26 forms a clutch. This clutch is normally urged into an engaged position by virtue of a spring 27 which bears between a surface of the piston 20 and a race 28 carried by the nut 24. On the other side of the nut 24 there is provided a further race 29 which can be engaged by an annular projection 30 on the internal surface of a further piston 31 slideable in a cylinder 32 formed in yet another body 33 mounted on the end of the body 26. Fluid pressure input ports 34 and 35 are provided in the body portions 26 and 33 to communicate with the right hand faces of pistons 20 and 31 respectively. A sealingly slideable thrust pad 36 is provided in an aperture in the end of the body portion 33 of the apparatus and this pad is engageable by a roller 37 carried by a manually operable lever 38 pivoted at a pivot 39 in clevis fork 40 provided in body 33. The lever 38 is provided with a socket 45 within which a long bar can be inserted to attain a high mechanical advantage as between the lever 38 and the roller 37. In order to avoid relative rotation between the piston 20 and the cylinder 19, the piston 20 is provided on its skirt with a longitudinal groove 42 which engages with a pin 43 mounted in the wall of the cylinder.

In operation of the brake actuator described above with reference to the drawing, by application of air pressure to the service pressure input port 12, the piston 3 is displaceable to the left urging the sleeve 6 and the tube 10 of the slack adjuster via the Belleville washer 7. The Belleville washer may be compressed to a degree depending upon the amount of the pneumatic pressure and the brakes are applied by the force exerted via the rod 11 to the brake rigging.

If the actuator is required to be used to lock-in a parking brake, a suitable braking pressure is applied at the port 12 and an additional pressure is applied at the input port 34 to thereby urge the piston 20 in a leftward direction against the thrust of the spring 21 such that the piston 20 follows and engages the piston rod 14 which is in effect connected to 3 and by virtue of the action of the nut 24 on the thread 23 and the tendency for leftward motion thereof, the nut 24 tends to be lifted from the clutching surface 25 and by virtue of the thrust of the spring 27 executes a rotation on the thread 23 to re-engage with the surface 25. Accordingly when the brake pressures at ports 12 and 34 are relieved, the resultant force exerted by the pistons 3 and 20 on the brake rigging and stored in Belleville washer 7 is locked in by the locking action of the clutch 25.

In order to unlock the locked-in brake application, it is necessary to again apply an approximately equivalent braking pressure at the port 12 to reduce brakes force on the clutch 25 otherwise exerted via the brake rigging and also to apply a suitable pneumatic pressure to the port 35 thereby urging the piston 31 a small distance leftwards such that the annular portion 30 engages the race 29 to lift the nut 24 away from the clutching surface 25. When so lifted from the surface 25, the nut 24 is able to rotate and the piston 20 is then deflected to its original position by virtue of the thrust of spring 21. Subsequent relief of the pressures more particularly at the port 12, enables the brake to be released. It may be noted that the area of the piston 31 is somewhat larger than the area of the piston 20 and assuming that the same air pressure is used to release the locks by pressurising the port 35 as has previously been used to supplement the braking and enable the clutching action to become effective to lock the brakes, a slight variation of braking pressure or rigging temperature which would lead to an increase of locked-in braking force, is overcome by virtue of the increased area of piston 31.

Completely manual release of the braking forces can be achieved by inserting a bar in the socket 45 of the lever 38 and deflecting the lever in an anticlockwise direction thereby urging the pad 36 against the piston 31 and in turn the annular part 30 against the race 29 to disengage the nut 24 from the clutching surface. Under these conditions, the nut 24 is able to rotate on the threaded portion 23 and the locked-in application is immediately released, the piston 20 returning to its shown starting position by virtue of the spring 21 and piston 3 returning to a release position by the actuator and brake rigging return springs.

Whilst not shown in the illustrated arrangement the locking portion may be arranged to operate as a locking portion for a further service portion mounted on the right hand side of the locking portion. Under these circumstances it is visualised that instead of cylinder 18 being part of back plate 13, it is a separate cylinder slideable within back plate 13 and suitably restrained from rotation. Body 33 has a cylindrical portion slideable within a back plate 13 of the further service portion and the clevis 40 actuates stem 14, in back plate 13 of the further service portion to be engaged with a further piston such as 3 operating in response to a further input pneumatic pressure to actuate another brake. Under these conditions, the cylinder portion 18 and adjoining portions 26 and 33 would be able to execute a floating motion between one service portion and the other. Again, normal service applications could be made and released as described above with reference to a pressure at the input port 12 and the lock would be enabled by application of a suitable pressure at the port 34 and thereafter releasable by a suitable pressure at the port 35 as before. Economy of locking mechanism would thereby be achieved insofar as one locking mechanism is provided for two service portions.

Various indications may be required or included for proving that the required locked-in braking pressure is present. Such proving may for example consist of a sensor which senses the displacement between the piston 3 and the sleeve 6. That is senses the degree of depression of the Belleville washer 7. Alternatively, a strain guage may be inserted in the rigging to indicate the degree of braking which is locked-in. Another requirement might be to indicate that the brakes are fully released. Again, a sensor may be provided to indicate that the piston 20 has returned to its initial position as shown. Such a sensor may comprise for example a micro-switch with a suitable electrical circuit connected thereto to provide the requisite indication.

It will be appreciated that the foregoing are merely examples of an application and variations of an actuator in accordance with the invention. Many modifications and improvements may be readily apparent to those skilled in the art which do not depart from the invention as defined in the claims below.

Having thus described our invention what we claim is:

1. A fluid pressure operable brake actuator including a housing having a first fluid pressure responsive member for exerting a brake applying force to an output member, said first member forming a movable wall of a first chamber having a brake-applying pressure input port, a second chamber sealed from said first chamber and having movable therein second and third pressure responsive members spaced from each other and movable relative to each other, a second fluid pressure input port in communication with the space between said second and third members, said third member forming a movable wall of a third chamber having a third input port, means engageable with said second pressure responsive member and sealingly slidable in the housing to cooperate with the first pressure responsive member such that force can be applied from said second pressure responsive member to said first pressure responsive member through said engageable means, a one-way clutching device coupled to the second pressure responsive member to retain it in engagement with said engageable means after application of a fluid pressure to the second input port such that said second pressure responsive member acts through said engageable means on said first pressure responsive member to lock-in a force applied to the output member due to a fluid pressure at the first input port, and means for releasing and clutching device upon selective movement of the third pressure responsive member in response to a fluid pressure at the third fluid pressure input port so as to permit release of said locked-in force.

2. A fluid pressure operable brake actuator as claimed in claim 1, said one-way clutching device comprising a helically threaded member carried by the second pressure responsive member threadedly cooperating with a further helically threaded member, means inhibiting rotation of said further threaded member by coming into engagement with a part of the housing in said second chamber, and said movement of the third pressure responsive member being operable to effect disengagement from said part.

3. A fluid pressure operable brake actuator as claimed in claim 2, said threaded members comprising respectively a rod and an internally threaded member, a light thrust spring being provided between them to maintain the clutch in engagement, and a relatively heavy spring being provided between the second pressure responsive member and the housing acting in the same sense relative to the clutch.

4. A fluid pressure operable brake actuator as claimed in claim 1, the effective area of the third pressure responsive member being greater than the area of the second pressure responsive member.

* * * * *